US008719506B2

(12) United States Patent
Kassoff

(10) Patent No.: US 8,719,506 B2
(45) Date of Patent: May 6, 2014

(54) PUSH MECHANISM FOR QUALITY OF SERVICE (QOS) SUPPORT IN COHERENCY PORT

(75) Inventor: Jason M. Kassoff, Denver, CO (US)

(73) Assignee: Apple Inc., Cupertino, CA (US)

( * ) Notice: Subject to any disclaimer, the term of this patent is extended or adjusted under 35 U.S.C. 154(b) by 352 days.

(21) Appl. No.: 13/300,886

(22) Filed: Nov. 21, 2011

(65) Prior Publication Data
US 2013/0132682 A1 May 23, 2013

(51) Int. Cl.
G06F 12/08 (2006.01)
(52) U.S. Cl.
USPC .... 711/122; 711/141; 711/143; 711/E12.017; 711/E12.048
(58) Field of Classification Search
USPC ........... 711/143, 122, 141, E12.017, E12.048
See application file for complete search history.

(56) References Cited

U.S. PATENT DOCUMENTS

| 6,425,060 | B1 | 7/2002 | Mounes-Toussi et al. |
| 7,146,468 | B2 | 12/2006 | Hardage, Jr. |
| 7,293,136 | B1 | 11/2007 | More et al. |
| 7,725,657 | B2 | 5/2010 | Hasenplaugh et al. |
| 2011/0173393 | A1 | 7/2011 | Isono |

Primary Examiner — Yong Choe
(74) Attorney, Agent, or Firm — Lawrence J. Merkel; Meyertons, Hood, Kivlin, Kowert & Goetzel, P.C.

(57) ABSTRACT

In an embodiment, a memory port controller (MPC) is coupled to a memory port and receives transactions from processors and a coherency port (ACP) used by one or more peripheral devices that may be cache coherent. The transactions include various quality of service (QoS) parameters. If a high priority QoS transaction is received on the ACP, the MPC may push previous (lower priority) transactions until the high priority transaction may be completed. The MPC may maintain a count of outstanding high priority QoS transactions. The L2 interface controller and ACP controller may push increment and decrement events based on processing the high priority QoS transactions, and the MPC may push the memory transactions when the count is non-zero. In an embodiment, the MPC may continue pushing transactions until the L2 interface controller informs the MPC that the earlier transactions have been completed.

24 Claims, 8 Drawing Sheets

Push = Transmit with Push || Complete Push

PUSH MECHANISM FOR QUALITY OF SERVICE (QOS) SUPPORT IN COHERENCY PORT

BACKGROUND

1. Field of the Invention

This invention is related to quality of service (QoS) management for memory transactions in a system.

2. Description of the Related Art

Various types of computing systems generally include a memory system that includes some form of random access memory (RAM). For example, dynamic random access memory (DRAM), such as various forms of double data rate (DDR, DDR2, DDR3, low power versions of the former) synchronous DRAMs (DDR SDRAMs), are currently popular. In some systems, static RAM (SRAM) is used instead of DRAM. The various devices in the system access the memory system using read and write transactions, which include a memory address identifying the memory location(s) accessed by the transaction. Read transactions transfer data from the memory system to the requestor, and write transactions transfer data from the requestor to the memory system. The address is defined in a memory address space that is primarily mapped to the memory system as opposed to peripheral devices such as mass storage devices (e.g. disk drives) and other input/output devices. However, a small portion of the memory address space can be mapped to peripheral devices ("memory-mapped I/O"), typically to access registers within the devices. An I/O address space can be used to access peripheral devices that are not accessible via memory mapped I/O as well.

Computing systems often include numerous devices which require access to memory. Some devices have high memory bandwidth requirements, but are less sensitive to latency. Some devices, e.g. displays, have real-time requirements that involve high bandwidth and predictable latency. Some devices have lower bandwidth requirements but are highly sensitive to latency (e.g. processors such as central processing units (CPUs)).

In order to effectively serve the needs of the disparate devices in a computing system, some memory controllers implement a QoS mechanism in which requestors can rank their transactions in terms of priority and type of service needed. Different requestors can specify their QoS requirements in different ways. However, complications can arise when transactions with higher QoS requirements arrive subsequent to transactions with lower QoS requirements at a particular point in the system.

SUMMARY

In an embodiment, a memory port controller is coupled to a memory port and receives memory transactions from one or more processors and from a coherency port used by one or more peripheral devices that may be cache coherent with the processors. In an embodiment, the processor transactions are received through a level 2 (L2) cache that is also checked for cache hits for transactions received through the coherency port. The transactions include various QoS parameters. If a high priority QoS transaction is received on the coherency port, the memory port controller may push previous (lower priority) transactions until the high priority transaction may be completed. Pushing the lower priority transactions may cause the transactions to be treated as high priority. The memory port controller, the coherency port controller, and the L2 cache may be in different clock domains. In an embodiment, the memory port controller may maintain a count of outstanding high priority QoS transactions. The L2 cache interface unit and the coherency port controller may transmit increment and decrement events based on processing the high priority QoS transactions, and the memory port controller may push the memory transactions when the count is non-zero.

In an embodiment, some high priority QoS transactions may complete in the L2 cache. However, earlier transactions may still be pushed by the memory port controller to improve performance and/or clear the memory pipeline for subsequent possible high priority QoS transactions. Additionally, in the case of a read miss in the L2 cache that does not cause a writeback of an evicted cache block, older write transactions may need to be pushed ahead of the read miss transaction for ordering reasons. The memory port controller may continue pushing transactions until the L2 cache interface unit informs the memory port controller that the earlier transactions have been completed (e.g. by passing an upgrade token to the memory port controller). The memory port controller may return to normal processing in response to receiving the upgrade token.

BRIEF DESCRIPTION OF THE DRAWINGS

The following detailed description makes reference to the accompanying drawings, which are now briefly described.

Figure 1:
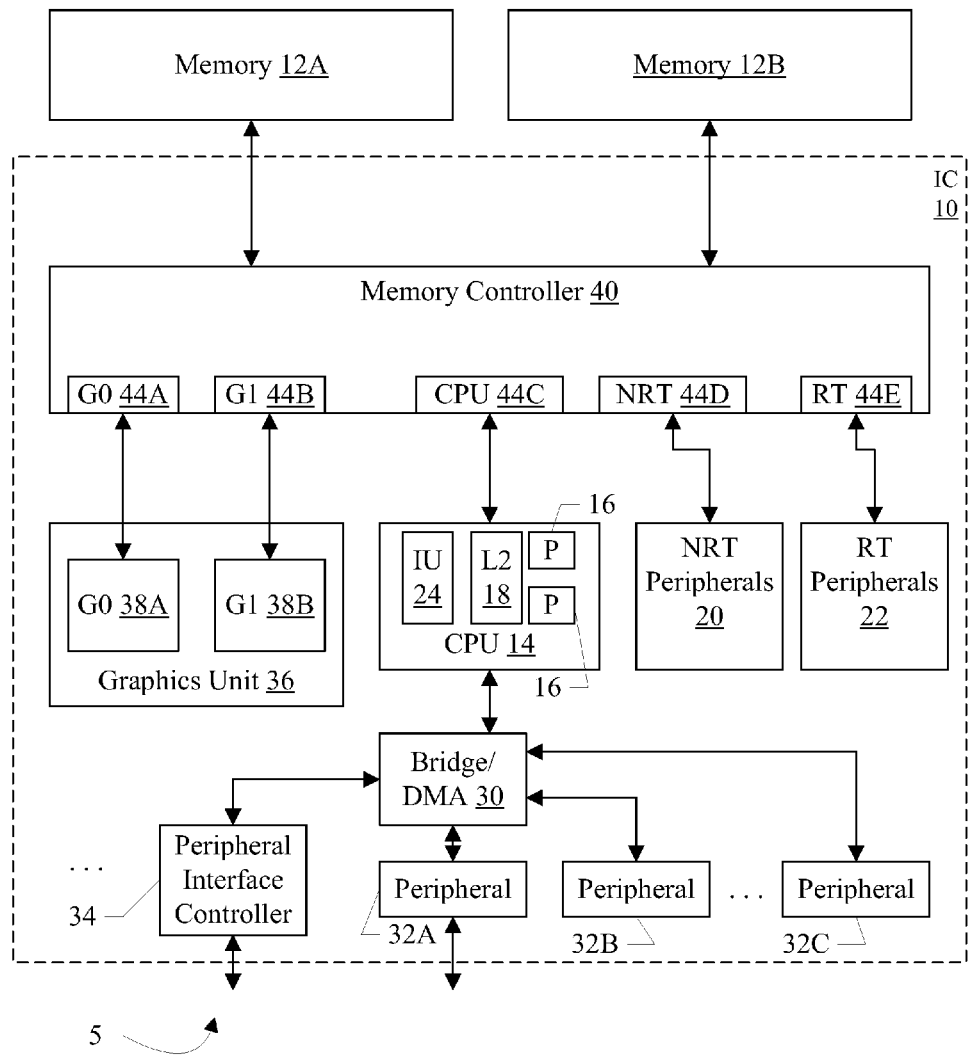
FIG. 1 is a block diagram of one embodiment of a system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Overview

Turning now to FIG. 1, a block diagram of one embodiment of a system 5 is shown. In the embodiment of FIG. 1, the system 5 includes an integrated circuit (IC) 10 coupled to external memories 12A-12B. In the illustrated embodiment, the integrated circuit 10 includes a central processor unit (CPU) block 14 which includes one or more processors 16, a level 2 (L2) cache 18, and an interface unit (IU) 24. Other embodiments may not include L2 cache 18 and/or may include additional levels of cache. Additionally, embodiments that include more than two processors 16 and that include only one processor 16 are contemplated. The integrated circuit 10 further includes a set of one or more non-real time (NRT) peripherals 20 and a set of one or more real time (RT) peripherals 22. In the illustrated embodiment, the CPU block 14 is coupled to a bridge/direct memory access (DMA) controller 30, which may be coupled to one or more peripheral devices 32A-32C and/or one or more peripheral interface controllers 34. The number of peripheral devices 32 and peripheral interface controllers 34 may vary from zero to any desired number in various embodiments. The system 5 illustrated in FIG. 1 further includes a graphics unit 36 comprising one or more graphics controllers such as G0 38A and G1 38B. The number of graphics controllers per graphics unit and the number of graphics units may vary in other embodiments. As illustrated in FIG. 1, the system 5 includes a memory controller 40 configured to communicate with the memories 12A-12B. The memory controller 40 also includes a set of ports 44A-44E. The ports 44A-44B are coupled to the graphics controllers 38A-38B, respectively. The CPU block 14 is coupled to the port 44C. The NRT peripherals 20 and the RT peripherals 22 are coupled to the ports 44D-44E, respectively. The number of ports included in a memory controller 40 may be varied in other embodiments, as may the number of memory controllers. That is, there may be more or fewer ports than those shown in FIG. 1.

The interface unit 24 may include circuitry configured to interface the CPU block 14 to the CPU memory port 44C and one or more ports to the bridge/DMA controller 30. Additionally, the interface unit 24 may include an interface to the L2 cache 18, and through the L2 cache 18 to the processors 16. More particularly, the ports to the bridge/DMA controller 30 may include a coherency port for accessing memory by the peripherals 32A-32C/peripheral interface controller 34 in a cache-coherent fashion with the L2 cache 18 and caches in the processors 16. The ports to the bridge/DMA controller 30 may further include a programmed I/O (PIO) port for PIO transactions issued to the peripherals in the 32A-32C and/or the peripheral interface controller 34.

Generally, a port may be a communication point on a unit (e.g. the memory controller 40, the CPU block 14, etc.) to communicate with one or more entities. In some cases, the port may be dedicated to an entity (e.g. the ports 44A-44B may be dedicated to the graphics controllers 38A-38B, respectively). In other cases, the port may be shared among multiple entities (e.g. the processors 16 may share the CPU port 44C, the NRT peripherals 20 may share the NRT port 44D, and the RT peripherals 22 may share the RT port 44E). Each port may include an interface to communicate with its respective entities. The interface may be any type of communication medium (e.g. a bus, a point-to-point interconnect, etc.) and may implement any protocol. The interconnect may also include any other desired interconnect such as meshes, network on a chip fabrics, shared buses, point-to-point interconnects, etc.

For each port, there may be a port controller. The port controller may include the circuitry that communicates on the port, and may include buffers for transactions received on the port and/or to be sent on the port. Generally, a transaction may be one transfer on the port. The transaction may include transmission of the address and other attributes of the transaction (e.g. size, type (read or write), quality of service (QoS) parameters, etc.). The transaction may further include a transfer of data. In a read transaction, the data is transferred to the initiator of the transaction. In a write transaction, the data is transferred from the initiator of the transaction. A memory transaction may be a transfer of data that is mapped to the memory system (e.g. the memories 12A-12B in FIG. 1). That is, the address in the transaction identifies storage locations in the memories 12A-12B. The data may be transferred to or from the locations, or may be provided to/from caches that are temporarily storing copies of the data. By way of comparison, I/O transactions such as PIOs may include an address that identifies a peripheral 32A-32C or peripheral interface controller 34, and the identified peripheral/peripheral interface controller may receive or provide the data.

In one embodiment, memory transactions may have associated QoS parameters. The QoS parameter for a memory transaction may identify a requested level of service for the memory transaction. Memory transactions with QoS parameter values requesting higher levels of service may be given preference (e.g. higher priority) over memory transactions requesting lower levels of service. Thus, a given source may be configured to use QoS parameters to identify which memory operations are more important to the source (and should be serviced prior to other memory operations from the same source), especially for sources that support out-of-order data transmissions with respect to the address transmissions from the source. Furthermore, the QoS parameters may permit sources to request higher levels of service than other sources on the same port and/or sources on other ports. Thus, for example, the memory controller 40 may be configured to arbitrate among transactions received on the ports 44A-44E based on the QoS parameters of the transactions.

In some embodiments, different traffic types may have different definitions of QoS parameters. That is, the different traffic types may have different sets of QoS parameters. The meaning of a given QoS parameter value depends on the set of QoS parameters from which it is drawn. For example, a set of RT QoS parameters may be defined and a set of NRT QoS parameters may be defined. Thus, an RT QoS parameter value is assigned meaning within the RT QoS parameter set and an NRT QoS parameter value is assigned meaning within the NRT QoS parameter set. Other embodiments may implement the same QoS parameter set on all ports or among all traffic types.

In one embodiment, the system 5 may include a set of RT QoS levels denoted as real time green (RTG), real time yellow (RTY) and real time red (RTR). The NRT QoS levels may include low latency (LLT) and best effort (BEF) levels. The RTG QoS level may be the lowest priority RT QoS level; the RTY QoS level may be the medium priority RT QoS level; and the RTR QoS level is the highest priority RT QoS level. Similarly, BEF QoS level may be the lowest priority NRT QoS level and the LLT QoS level may be the highest priority NRT QoS level. There may be more or fewer QoS levels in each set in other embodiments.

The RTG, RTY, and RTR QoS levels may reflect relative levels of urgency from an RT source. That is, as the amount of time before data is needed by the RT source to prevent erroneous operation decreases, the QoS level assigned to each memory operation increases to indicate the higher urgency. The BEF NRT QoS level may be a request to return the data as quickly as the memory controller 40 is able, once the needs of other flows of data are met. On the other hand, the LLT NRT QoS level may be a request for low latency data.

Memory transactions received by the CPU block 14 on the coherency port may have varying QoS levels. Particularly, transactions having QoS levels that imply a higher priority than the QoS levels of previously received transactions may be received on the coherency port. The interface unit 24 may be configured to manage the flow of transactions to the memory controller 40 to meet these requirements. For example, if a transaction having a higher priority (e.g. an RTR or RTY QoS parameter) is received, the interface unit may push lower-priority, previously-received transactions. A transaction may be "pushed" if it is treated as a high priority transaction, even if its own QoS parameter indicates a lower priority. The QoS parameter itself may not be changed, in some embodiments. By pushing the lower priority transactions, the higher priority transaction may be more rapidly transmitted to the memory controller 40 and thus may be completed more quickly. Additionally, while the lower priority transactions may lose arbitration with transactions from other ports, pushing them to the memory controller 40 may permit the memory controller 40 to prioritize the transactions more highly and thus the memory controller 40 may reach the higher priority transaction more quickly as compared to other transactions. Various embodiments of the interface unit 24 which support the pushing features are described in more detail below.

As mentioned above, the coherency port may be used to transmit memory transactions that are cache coherent with the L2 cache 18 and processor caches. Various coherency schemes may be used, such as the modified, exclusive, shared, invalid (MESI) scheme, the modified, owned, exclusive, shared, invalid (MOESI) scheme, etc. Generally, the coherency scheme may define how data is shared among multiple caches and other requestors to ensure that a coherent write made by one entity is detected in a subsequent coherent read by another entity or is overwritten by a subsequent coherent write by another entity.

The processors 16 may implement any instruction set architecture, and may be configured to execute instructions defined in that instruction set architecture. The processors 16 may employ any microarchitecture, including scalar, superscalar, pipelined, superpipelined, out of order, in order, speculative, non-speculative, etc., or combinations thereof The processors 16 may include circuitry, and optionally may implement microcoding techniques. The processors 16 may include one or more level 1 caches, and thus the cache 18 is an L2 cache. Other embodiments may include multiple levels of caches in the processors 16, and the cache 18 may be the next level down in the hierarchy. The cache 18 may employ any size and any configuration (set associative, direct mapped, etc.).

The graphics controllers 38A-38B may be any graphics processing circuitry. Generally, the graphics controllers 38A-38B may be configured to render objects to be displayed into a frame buffer. The graphics controllers 38A-38B may include graphics processors that may execute graphics software to perform a part or all of the graphics operation, and/or hardware acceleration of certain graphics operations. The amount of hardware acceleration and software implementation may vary from embodiment to embodiment.

The NRT peripherals 20 may include any non-real time peripherals that, for performance and/or bandwidth reasons, are provided independent access to the memory 12A-12B. That is, access by the NRT peripherals 20 is independent of the CPU block 14, and may proceed in parallel with CPU block memory operations. Other peripherals such as the peripherals 32A-32C and/or peripherals coupled to a peripheral interface controlled by the peripheral interface controller 34 may also be non-real time peripherals, but may not require independent access to memory. Various embodiments of the NRT peripherals 20 may include video encoders and decoders, scaler circuitry and image compression and/or decompression circuitry, etc.

The RT peripherals 22 may include any peripherals that have real time requirements for memory latency. For example, the RT peripherals may include an image processor and one or more display pipes. The display pipes may include circuitry to fetch one or more frames and to blend the frames to create a display image. The display pipes may further include one or more video pipelines. The result of the display pipes may be a stream of pixels to be displayed on the display screen. The pixel values may be transmitted to a display controller for display on the display screen. The image processor may receive camera data and process the data to an image to be stored in memory.

The bridge/DMA controller 30 may comprise circuitry to bridge the peripheral(s) 32 and the peripheral interface controller(s) 34 to the memory space. In the illustrated embodiment, the bridge/DMA controller 30 may bridge the memory operations from the peripherals/peripheral interface controllers through the CPU block 14 to the memory controller 40. The CPU block 14 may also maintain coherence between the bridged memory operations and memory operations from the processors 16/L2 Cache 18. The L2 cache 18 may also arbitrate the bridged memory operations with memory operations from the processors 16 to be transmitted on the CPU interface to the CPU port 44C. The bridge/DMA controller 30 may also provide DMA operation on behalf of the peripherals 32 and the peripheral interface controllers 34 to transfer blocks of data to and from memory. More particularly, the DMA controller may be configured to perform transfers to and from the memory 12A-12B through the memory controller 40 on behalf of the peripherals 32 and the peripheral interface controllers 34. The DMA controller may be programmable by the processors 16 to perform the DMA operations. For example, the DMA controller may be programmable via descriptors. The descriptors may be data structures stored in the memory 12A-12B that describe DMA transfers (e.g. source and destination addresses, size, etc.). Alternatively, the DMA controller may be programmable via registers in the DMA controller (not shown).

The peripherals 32A-32C may include any desired input/output devices or other hardware devices that are included on the integrated circuit 10. For example, the peripherals 32A-32C may include networking peripherals such as one or more networking media access controllers (MAC) such as an Ethernet MAC or a wireless fidelity (WiFi) controller. An audio unit including various audio processing devices may be included in the peripherals 32A-32C. One or more digital signal processors may be included in the peripherals 32A-32C. The peripherals 32A-32C may include any other desired functional such as timers, an on-chip secrets memory, an encryption engine, etc., or any combination thereof.

The peripheral interface controllers 34 may include any controllers for any type of peripheral interface. For example, the peripheral interface controllers may include various interface controllers such as a universal serial bus (USB) controller, a peripheral component interconnect express (PCIe) controller, a flash memory interface, general purpose input/output (I/O) pins, etc.

The memories 12A-12B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMM5), etc. Alternatively, the devices may be mounted with the integrated circuit 10 in a chip-on-chip configuration, a package-on-package configuration, or a multi-chip module configuration.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

QoS Management

Figure 2:
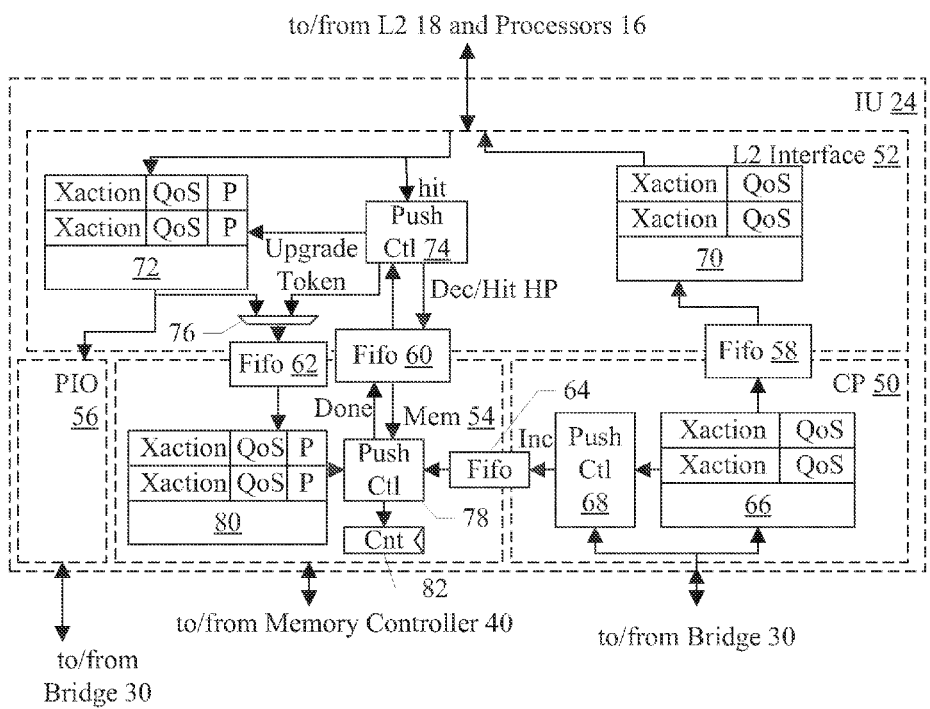
FIG. 2 is a block diagram of one embodiment of a central processing unit (CPU) interface unit (IU).

Turning now to FIG. 2, a block diagram of one embodiment of the interface unit 24 is shown. In the embodiment of FIG. 2, the interface unit 24 includes a coherency port (CP) controller 50, an L2 interface unit 52, a memory port controller 54, and a PIO port controller 56. Each of the CP controller 50, the L2 interface unit 52, the memory port controller 54, and the PIO port controller 56 may be in their own respective clock domains. For example, the CP port controller 56 may be in a clock domain corresponding to the clocks used by the bridge/DMA unit 30 (and, in some embodiments, the peripherals 32A-32C and/or peripheral interface controller 34). The L2 interface unit 52 may be in a CPU clock domain corresponding to the CPU clocks used by the L2 cache 18 and the processors 16. The memory port controller 54 may be in a memory clock domain corresponding to a clock used in the memory controller 40. The PIO port controller 56 may be in a clock domain corresponding to the bridge/DMA unit 30 as well.

The clocks corresponding to the clock domains may have different frequencies and/or different sources during use, and thus transmitting information between the clock domains may include a synchronization from the source clock domain to the target clock domain. There are a variety of synchronization mechanisms, and synchronizing first in, first out buffers (FIFOs) are shown in FIG. 2 (e.g. FIFOs 58, 60, 62, and 64). Generally, a clock domain may comprise any synchronous circuitry that is clocked by a clock that defines the clock domain, or by another clock that is directly derived from the domain-defining clock and thus has a known timing relationship with the domain-defining clock.

As illustrated in FIG. 2, the CP controller 50 includes a queue 66 and a push control circuit 68. The queue 66 and the push control circuit 68 are coupled to receive transactions on the CP port from the bridge 30, and the queue 66 is coupled to the FIFO 58 and the push control circuit 68. The push control circuit 68 is coupled to the FIFO 64. The L2 interface unit 52 includes an inbound queue 70, an outbound queue 72, a push control circuit 74, and a mux 76. The inbound queue 70 is coupled to the FIFO 58 and to provide transactions to the L2 cache 18/processors 16. The outbound queue 72 is coupled to receive transactions from the L2 cache 18/processors 16 (and transactions from the inbound queue 70 that have passed to the L2 cache 18). The outbound queue 72 is further coupled to the push control circuit 74, the mux 76, and the PIO port controller 56. The push control circuit 74 is coupled to the mux 76 and the FIFO 60, and the L2 cache 18/processors 16. The mux 76 is coupled to the FIFO 62. The memory port controller 54 includes a push control circuit 78, a queue 80, and a count register 82. The push control circuit 78 is coupled to the FIFOs 60 and 64, the count register 82, and the queue 80. The queue 80 is coupled to the FIFO 62.

As mentioned previously, if a higher priority QoS transaction is received on the coherency port, the interface unit 24 is configured to push previously-received transactions to more quickly service the higher priority QoS transactions. Different embodiments may define the higher priority QoS for which pushing is implemented in different fashions. For example, a higher priority QoS may be any QoS that indicates a higher priority than the QoS of previously received transactions on the port. Alternatively, a higher priority QoS may be a QoS above a threshold level. Or, a higher priority QoS may be a subset of the QoS parameters (e.g. RTR, or RTR and RTY, or RTR, RTY, and LLT).

The number of clock domains that are involved in the pushing of transactions in the interface unit 24 presents challenges to implementing the push. A transaction received on the CP may be enqueued in the CP queue 66, passed to the L2 interface unit 52 through the FIFO 58 and enqueued in the inbound queue 70, passed from the inbound queue 70 to the L2 cache 18 and processors 16 to maintain coherency and possible retrieve data (for a read transaction), pass to the outbound queue 72 in the case of a cache miss or a write transaction, pass through the FIFO 62 to the queue 80 in the memory port controller 54, and over the memory port to the memory controller 40. Thus, there may be numerous transactions in flight between the coherency port and the memory port to be pushed, and those transactions may be in several clock domains.

The interface unit 24 may support one or more mechanisms to perform the push, via the push control circuits 68, 74, and 78. For example, the push control circuit 78 may maintain a count of outstanding high priority QoS transactions and may push transactions while the count is non-zero. A transaction may be outstanding in this context if the transaction has been received on the CP port (or in some cases is pending on the CP port awaiting acceptance by the CP controller 50) and has not yet been completed in the L2 cache 18 (cache hit) or transmitted to the memory controller 40 (cache miss). The CP controller 50 (and more particularly the push control circuit 68) may be configured to detect the high priority QoS transactions and to transmit an increment indication to the memory port controller 54 (and more particularly to the push control circuit 78, through the FIFO 64). The increment indication may have any form. For example, the increment indication may be a bit indicating increment when set (and no increment when clear). Alternatively, in one embodiment, the count may be maintained as two counts, one for reads and one for writes.

The increment indication may include increment read and increment write bits. The transmission of an increment may also be referred to as an increment event. Similarly, in some cases, a high priority QoS transaction may be completed in the L2 cache 18 (e.g. a read hit). The L2 interface unit 52 (and more particularly the push control circuit 74) may be configured to detect such cases and to transmit a decrement indication, or decrement event, to the memory port controller 54 (and more particularly to the push control circuit 78). Similar to the increment indication, the decrement indication may be a bit, bits for reads and writes, etc. Additional details regarding the increment and decrement are provided below.

Another mechanism for pushing memory transactions may be implemented for the case in which a high priority QoS transaction hits in the L2 cache 18 and is completed there. While the high priority QoS transaction will not progress to the memory controller 40, it may still be desirable to ensure that the previous memory transactions are pushed to the memory controller. For this case, the push control circuit 74 may be configured to detect the cache hit and that the transaction is a high priority QoS transaction, and to signal the event to the push control circuit 78 (through the FIFO 60, show as Hit HP in FIG. 2). The push control circuit 78 may be configured to transition to a "transmit with push" state in response, and may push memory transactions until the push control circuit 74 informs the push control circuit 78 that the previous transactions that were in flight when the high priority QoS transaction hit in the L2 cache 18 have completed. In the illustrated embodiment, the push control circuit 74 may be configured to transmit an "upgrade token" in the stream of transactions provided to the memory port controller 54 (e.g. by controlling the mux 76 in FIG. 2). The upgrade token may be a reserved encoding that is not a valid transaction, which the push control circuit 78 may detect to exit the "transmit with push" state.

The above mechanism may also be used to handle a case of an L2 cache miss for a read transaction that does not cause a writeback of a cache block from the L2 cache 18. For ordering reasons, certain write transactions that are older than the read transaction may need to precede the read transaction to the memory controller. The transmit with push mechanism may achieve this ordering of older write transactions ahead of the read transaction as well, in some embodiments, even though there is not a high priority write transaction to push the older write transactions.

As mentioned above, transactions may be received into the CP controller 50, and more particularly the queue 66. The queue 66 may include multiple entries, where each transaction may be stored in one entry. The transaction may include various information such as the address, the type (e.g. read or write), the size, etc. Each transaction may also include a QoS parameter, shown separately in the queue 66 and other queues in FIG. 2. Similarly, the inbound queue 70 may include multiple entries, each storing a transaction and QoS parameter. The CP controller 50 may be configured to select transactions from the queue 66 and transmit them through the FIFO 58 to the inbound queue 70. The L2 interface unit 52 may be configured to select transactions from the inbound queue 70 for transmission to the L2 cache 18 and processors 16 (e.g. arbitrating with transactions from the processors 16 for access to the L2 cache 18). Transactions from the inbound queue 70 that miss in the L2 cache 18 or otherwise are to be transmitted to the memory controller 40 may be queued in the outbound queue 72, along with transactions sourced by the processors 16 that are to be transmitted to the memory controller 40. PIO transactions may also be queued in the outbound queue 72. A PIO transaction is a transaction that is transmitted to a peripheral device (e.g. devices 32A-32C) or peripheral interface controller (e.g. controller 34) through the PIO port controlled by PIO port controller 56. The L2 interface 52 may be configured to decode addresses and/or other transaction attributes to identify PIO versus memory transactions. The L2 interface unit 52 may be configured to transmit the memory transactions from the queue 72 through the mux 76 and the FIFO 62 to the queue 80. The memory port controller 54 may be configured to select the transactions from the queue 80 and transmit the transactions to the memory controller 40 (optionally with an indication of the push, if pushing is underway).

The queues 72 and 80 include entries that store transactions and QoS parameters, and also include a push indication (P). The push indication may, e.g., be a bit that may be set to indicate push and clear to indicate no push (or vice versa). Alternatively, the push indication may be a multi-bit value. For example, the push indication may be coded as a QoS parameter, and may indicate the QoS level at which the transaction should be processed if it is being pushed. When the push control circuit 74 detects a cache hit for the high priority QoS transaction, the push control circuit 74 may be configured to set the push indication to the push state (e.g. set the bit) for each transaction that is then in the outbound queue 72.

It is noted that the interface unit 24 may include additional components and circuitry not shown in FIG. 2. For example, the return of read data from the memory controller 40 through the memory port controller 54 to the L2 interface unit 52 and/or the CP controller 50 is not shown in FIG. 2.

Figure 3:
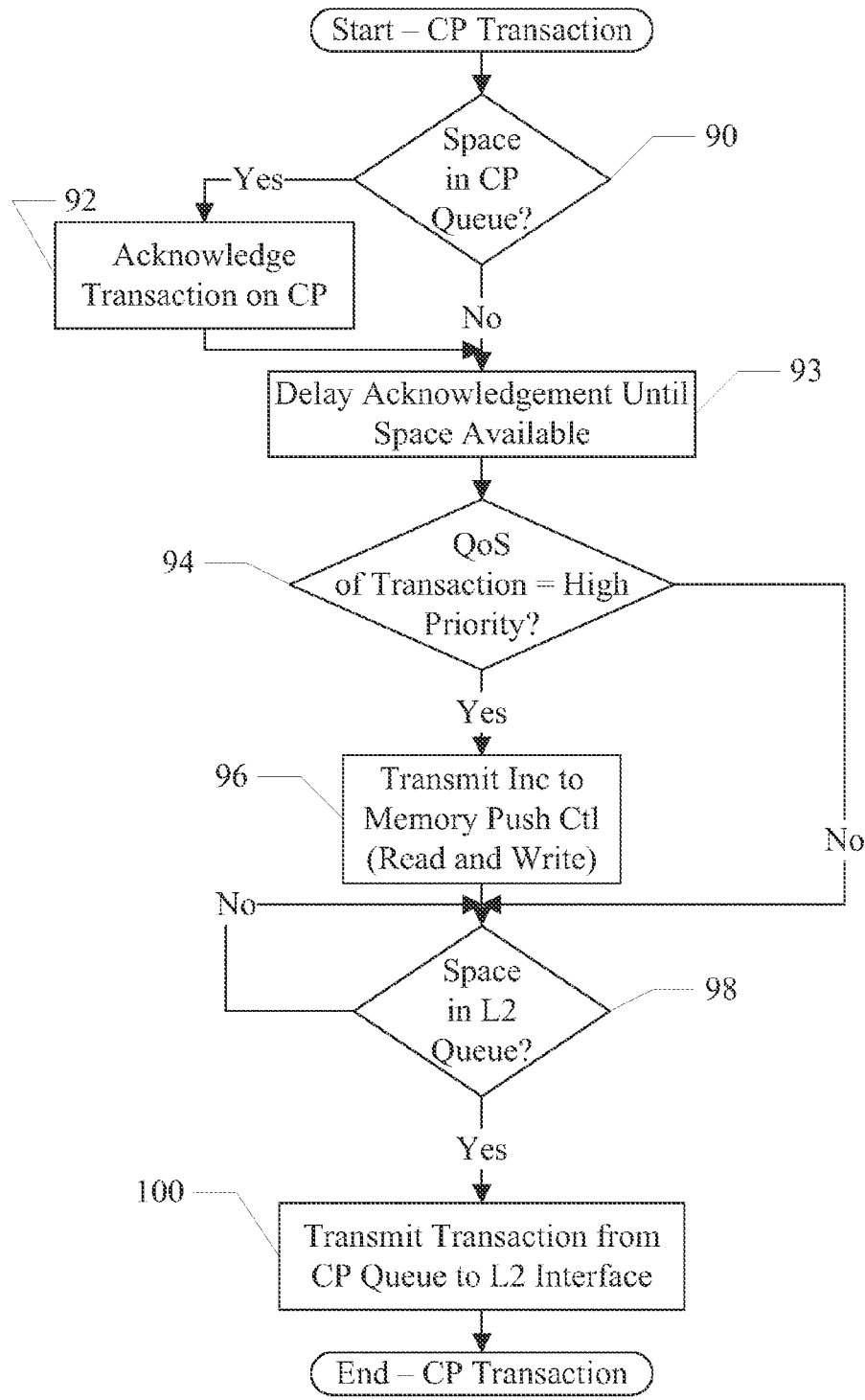
FIG. 3 is a flowchart illustrating operation of one embodiment of a coherency port CP controller in response to receiving a transaction on the port.

Turning now to FIG. 3, a flowchart illustrating operation of one embodiment of the CP controller 50 in response to a transaction on the coherency port is shown. While the blocks are shown in a particular order for ease of understanding, other orders may be used. Blocks may be performed in parallel in combinatorial logic within the CP controller 50. Blocks, combinations of blocks, and/or the flowchart as a whole may be pipelined over multiple clock cycles of the clock corresponding to the CP clock domain. The CP controller 50 and portions thereof, such as the push control circuit 68, may be configured to implement the operation illustrated in FIG. 3.

The CP interface may be a master/slave interface in which the source (e.g. the bridge/DMA controller 30) may transmit a request to the CP controller 50 and may maintain the request pending on the interface until acknowledged by the CP controller 50. If there is space in the CP queue 66 to store the transaction information (decision block 90, "yes" leg), the CP controller 50 may be configured to acknowledge the transaction and write the transaction information into the CP queue 66 (block 92). If there is no space in the CP queue 66 for the transaction, the CP controller 50 may be configured to delay acknowledgement until space is available (block 93). In some embodiments, the operation of the remainder of FIG. 3 may be delayed until the transaction is acknowledged. However, other embodiments may permit the transmission of the high priority increment while the transaction remains pending on the CP interface, and thus block 93 is provided to illustrate that the acknowledgement may be delayed. Additionally, the push control circuit 68 may be configured to detect if the QoS of the transaction indicates a high priority for the transaction (decision block 94). As mentioned above, various embodiments may define the high priority for pushing transactions in various ways. For example, a higher priority QoS may be any QoS that indicates a higher priority than the QoS of previously received transactions on the port. Alternatively, a higher priority QoS may be a QoS above a threshold level. Or, a higher priority QoS may be a subset of the QoS parameters (e.g. RTR, or RTR and RTY, or RTR, RTY, and LLT). If the transaction's QoS does indicate high priority (decision block 94, "yes" leg), the push control circuit 58 may be configured to transmit an increment event to the memory push control circuit 78 (through the FIFO 64) (block 96). In one embodiment, both a read increment and a write increment may be indicated. For read transactions, the read increment is for the read itself, and the write increment may be a speculative increment for a possible victim writeback transaction, if the read misses in the L2 cache 18. For write transactions, the write increment is for the write itself (for a writethrough cache) or may be for a victim writeback transaction in the event of a miss in the L2 cache 18 for a write. The read increment may be a speculative increment for the case that the write misses as well (to read the block updated by the write transaction).

In one embodiment, the push control circuit 68 may be configured to transmit increment events for transactions that are written into the CP queue 66, and may also be configured to transmit increment events for transactions that are pending on the coherency port awaiting acceptance (as mentioned above). In the case that the increment events are transmitted for pending (on the coherency port) transactions, the push control circuit 68 may be configured to track the fact that the increment event has already been sent until the transaction is accepted into the CP queue 66, so that only one increment event per transaction is generated.

If there is space in the L2 inbound queue 70 (decision block 98, "yes" leg), the CP controller 50 may be configured to transmit a transaction from the CP queue 66 to the L2 interface unit 52 (e.g. through the FIFO 58) (block 100). The corresponding entry in CP queue 66 may be freed. In an embodiment, a response queue (not shown) may be provided for queuing responses to return to requestors on the coherency port (e.g. read responses with read data, write done responses, etc.).

Figure 4:
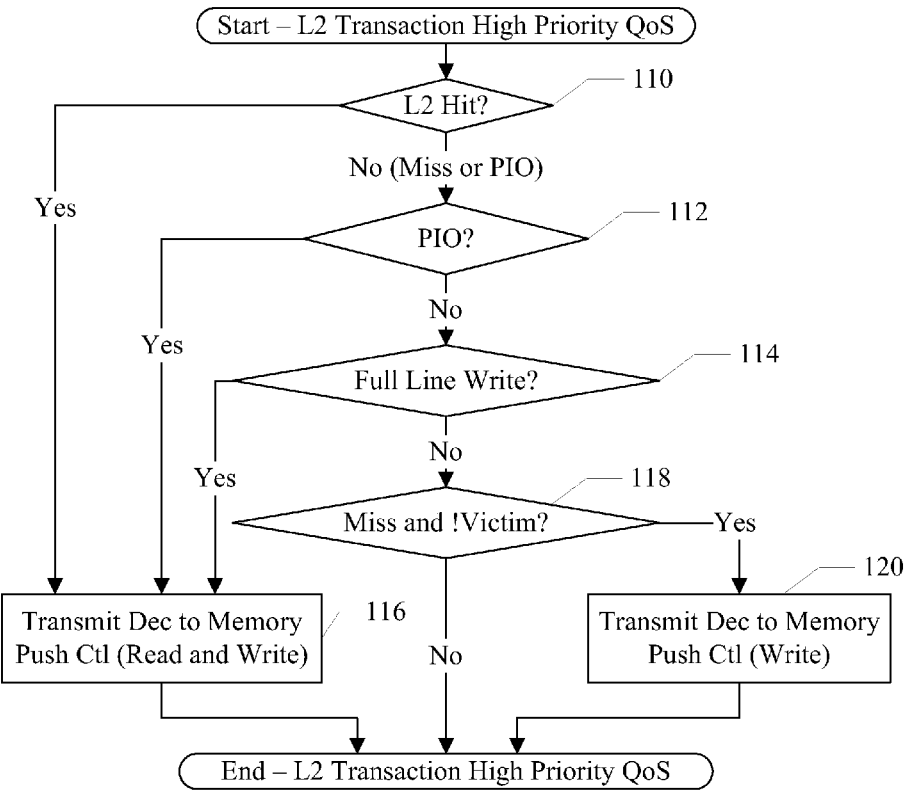
FIG. 4 is a flowchart illustrating operation of one embodiment of an L2 interface unit in response to receiving a transaction with high priority QoS from the CP controller.

Turning now to FIG. 4, a flowchart illustrating operation of one embodiment of the L2 interface unit 52 in response to issuing a high priority QoS transaction from the inbound queue 70 is shown. While the blocks are shown in a particular order for ease of understanding, other orders may be used. Blocks may be performed in parallel in combinatorial logic within the L2 interface unit 52. Blocks, combinations of blocks, and/or the flowchart as a whole may be pipelined over multiple clock cycles of the clock corresponding to the L2 clock domain. The L2 interface unit 52 and portions thereof, such as the push control circuit 74, may be configured to implement the operation illustrated in FIG. 4.

If the high priority QoS transaction is an L2 cache hit (decision block 110, "yes" leg), or the transaction is a PIO and thus will be transmitted by the PIO port controller 56 (decision block 112, "yes" leg), or the transaction is a full line write (decision block 114, "yes" leg), the push control circuit 74 may transmit a decrement event to the memory push control circuit 78 through the FIFO 60 (block 116). The decrement event may indicate both a read decrement and a write decrement. In the case of an L2 cache hit (indicated by the hit signal to the push control circuit 74 from the L2 cache 18), the high priority QoS transaction may complete in the L2 cache and thus the read and write increments that were signalled by the push control circuit 68 may be decremented. In the case of a PIO, the transaction will be completed on the PIO port and thus will not arrive at the memory port controller 54. Accordingly, the increments that were made for the transaction may be decremented. In the case of a full line write, as an optional optimization, no data is read and the line is written to the L2 cache 14. Accordingly, both increments that were originally made for the transaction may be decremented.

Additionally, in the case of an L2 cache miss but no victim writeback operation is generated (decision block 118, "yes" leg), the push control circuit 74 may be configured to transmit a decrement event indicating only decrement write (block 120). As mentioned previously, the write increment was generated speculatively in case there was a victim writeback operation. Since a victim writeback operation was not detected, the write decrement may be transmitted.

Figure 5:
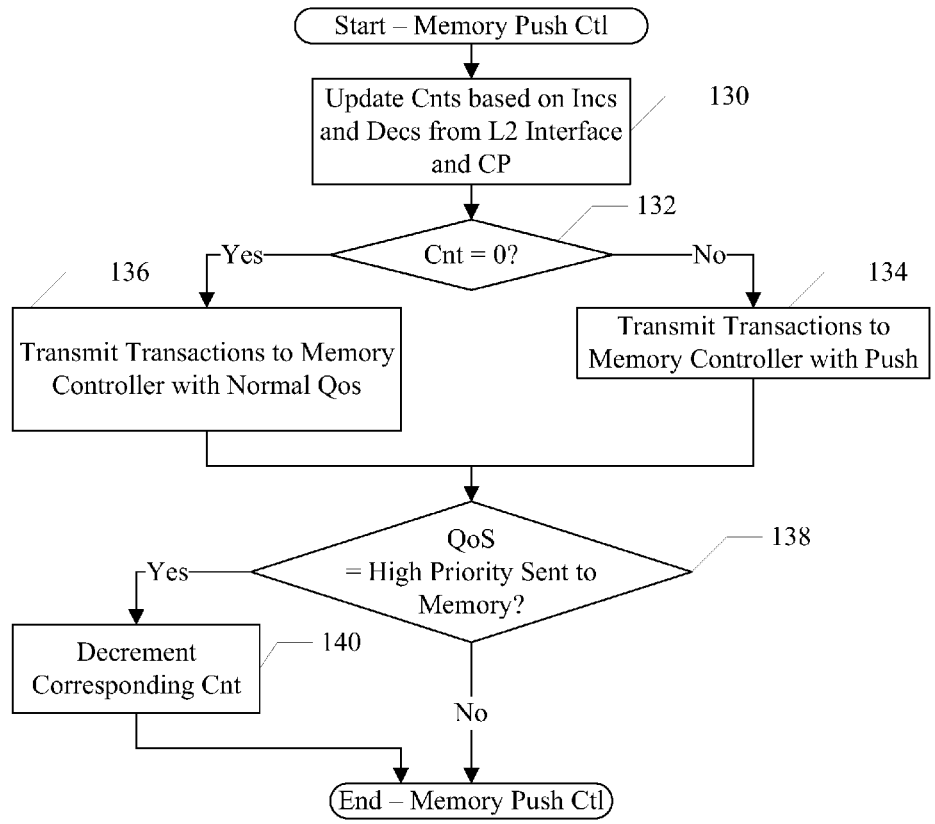
FIG. 5 is a flowchart illustrating operation of one embodiment of a memory push control circuit in a memory port controller.

Turning now to FIG. 5, a flowchart illustrating operation of one embodiment of the memory port controller 54 is shown. While the blocks are shown in a particular order for ease of understanding, other orders may be used. Blocks may be performed in parallel in combinatorial logic within the memory port controller 54. Blocks, combinations of blocks, and/or the flowchart as a whole may be pipelined over multiple clock cycles of the clock corresponding to the memory clock domain. The memory port controller 54 and portions thereof, such as the push control circuit 78, may be configured to implement the operation illustrated in FIG. 5.

The push control circuit 78 may be configured to update the counter register 82 based on the increments and decrements received from the CP controller 50 and the L2 interface unit 52 (block 130). The counter register 82 may include a write count field and a read count field. Each field may be initialized to zero at reset, and then incremented/decremented in response to respective increments and decrements. If increments and decrements for the same counter field are received in the same clock cycle, the net increment or decrement indicated by the received events may be applied. It is noted that the update of the counter register 82 may be performed continuously, in parallel with the other operations illustrated in FIG. 5.

If the counter is not zero (decision block 132, "no" leg), the push control circuit 78 may be configured to ensure that transactions are transmitted to the memory controller with the push indication indicating that the memory controller 40 should treat the transaction as higher priority that that indicated by its QoS field (block 134). In the case of both read and write counter fields, the counter may be considered to be non-zero if either counter field is non-zero. On the other hand, if both counter fields are zero (or the counter is zero—decision block 132, "yes" leg), the push control circuit 78 may not assert the push indication and the memory port controller 54 may be configured to transmit the transactions with their normally assigned QoS parameters (block 136). Additionally, if a high priority QoS transaction is transmitted to the memory controller (decision block 138, "yes" leg), the push control circuit 78 may be configured to decrement the corresponding counter field (read counter for a read transaction, write counter for a write transaction) (block 140).

Figure 6:
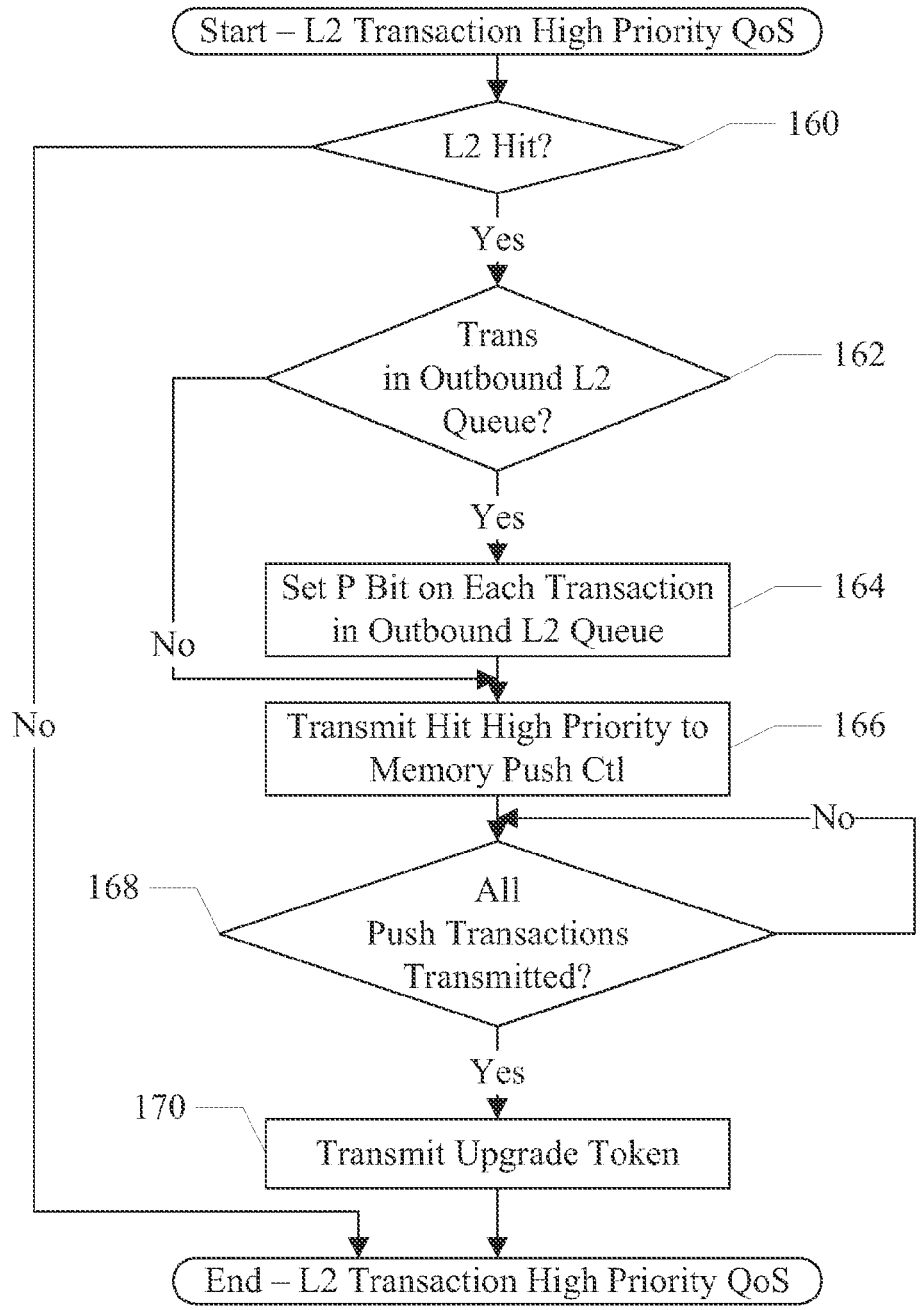
FIG. 6 is a flowchart illustrating operation of one embodiment of the L2 interface unit in response to receiving a transaction with high priority QoS from the CP controller.

FIG. 6 is a flowchart illustrating additional operation of one embodiment of the L2 interface unit 52 in response to issuing a high priority QoS transaction from the inbound queue 70. While the blocks are shown in a particular order for ease of understanding, other orders may be used. Blocks may be performed in parallel in combinatorial logic within the L2 interface unit 52. Blocks, combinations of blocks, and/or the flowchart as a whole may be pipelined over multiple clock cycles of the clock corresponding to the L2 clock domain. The L2 interface unit 52 and portions thereof, such as the push control circuit 74, may be configured to implement the operation illustrated in FIG. 6.

The flowchart of FIG. 6 illustrates operation for an embodiment in which the L2 interface unit 52 and the memory port controller 54 ensure that previously received memory transactions are still pushed to the memory controller 40 when a high priority QoS transaction completes in the L2 cache 18. If the high priority QoS transaction is an L2 cache hit (decision block 160, "yes" leg), and there is at least one transaction in the outbound L2 queue 72 (decision block 162, "yes" leg), the push control circuit 74 may be configured to set the push bit for each transaction in the queue 72 (block 164). Additionally, the push control circuit 74 may be configured to transmit a hit high priority indication to the memory push control circuit 78 (block 166). The push control circuit 74 may be configured to monitor the push bits in the outbound queue 72, and may detect that all transactions having the push bit set have been transmitted to the memory port controller 54 (decision block 168, "yes" leg). In response, the push control circuit 74 may generate the upgrade token, select the token through the mux 76, and transmit the token to the memory port controller 54 (block 170).

In one embodiment, the L2 interface unit 52 may stall subsequent high priority QoS transactions in the queue 70 in response to detecting an L2 cache hit for one of the transactions. Alternatively the L2 interface unit 52 may continue processing the high priority QoS transactions. If intervening transactions are enqueued in the outbound queue 72, those transactions may have their push bits set on the next high priority QoS hit detected in the L2 cache 18. The upgrade token may be transmitted once the last of the pushed memory transactions are transmitted to the memory port controller 54.

In one embodiment, the L2 interface unit 52 may stall additional memory transaction processing in response to transmitting the upgrade token. In such embodiments, once the memory port controller 54 has completed pushing the remaining memory transactions to the memory controller 40, the memory port controller 54 may be configured to transmit a done indication to the L2 interface unit 52 (e.g. "Done" in FIG. 2, passed to the push control circuit 74 through the FIFO 60). The L2 interface unit 52 may be configured to resume processing of memory transactions in response to the done indication.

Figure 7:
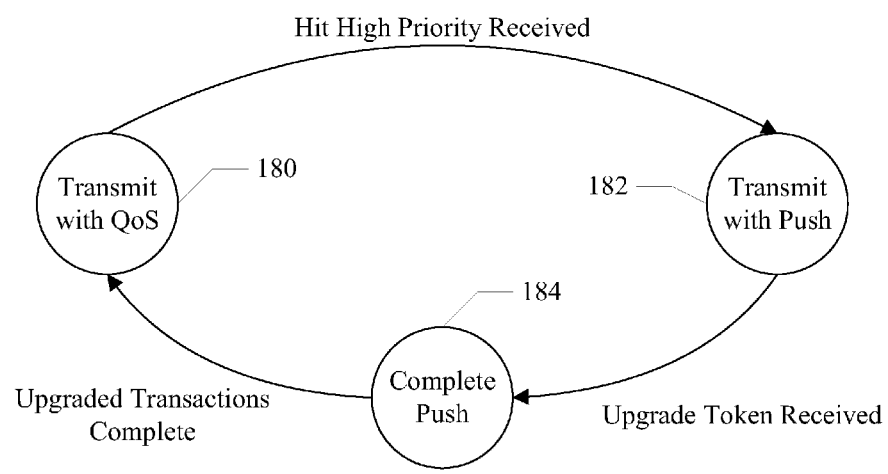
FIG. 7 is a block diagram of one embodiment of a state machine in one embodiment of the push control circuit in the memory port.

Turning now to FIG. 7, a state machine diagram is shown illustrating operation of one embodiment of the memory port controller 54, and more particularly the push control circuit 78, to push memory transactions that were prior to a high priority QoS transaction that completed in the L2 cache 18. In the illustrated embodiment, there are three states: transmit with QoS state 180, transmit with push state 182, and complete push state 184. When in a given state, the state machine may remain in that state until transitioning to a new state via one of the transition arrows shown in FIG. 7.

In the transmit with QoS state 180, the push control circuit 78 is not pushing memory transactions (unless the counter register 82 is non-zero, in some embodiments). The push control circuit 78 may be configured to transmit memory transactions and their associated QoS parameters to the memory controller 40. In response to hit high priority indication from the L2 interface unit 52, the push control circuit 78 may be configured to transition to the transmit with push state 182. In the transmit with push state 182, the memory port controller 54 may be configured to transmit memory transactions with the push bit set to the memory controller 40. The push control circuit 78 may be configured to transition to the complete push state 184 in response to receiving the upgrade token. In the complete push state 184, the memory port controller 54 may continue pushing memory transactions, but may be monitoring for completion of the memory transactions that were in the queue 80 when the transition to the complete push state 184 occurred. Once those memory transactions have been transmitted to the memory controller 40, the push may be complete and the push control circuit 78 may be configured to transition to the transmit with QoS state 180.

Additionally, when returning to the transmit with QoS state 180, the push control circuit 78 may be configured to transmit the done indication to the push control circuit 74 through the FIFO 60, in some embodiments. As illustrated in the formula at the bottom of FIG. 7, the push control circuit 78 may push memory transactions in both the transmit with push state 182 and the complete push state 184 (i.e. the OR of the two states).

System

Figure 8:
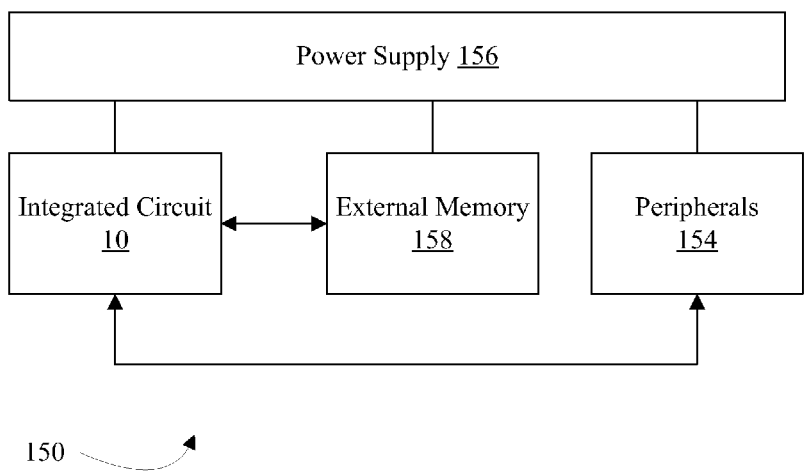
FIG. 8 is a block diagram of another embodiment of the system.

Turning next to FIG. 8, a block diagram of one embodiment of a system 150 is shown. In the illustrated embodiment, the system 150 includes at least one instance of an integrated circuit 10 (from FIG. 1) coupled to one or more peripherals 154 and an external memory 158. The external memory 158 may include the memory 12. A power supply 156 is also provided which supplies the supply voltages to the integrated circuit 10 as well as one or more supply voltages to the memory 158 and/or the peripherals 154. In some embodiments, more than one instance of the integrated circuit 10 may be included (and more than one external memory 158 may be included as well).

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, etc. The external memory 158 may include one or more memory modules to which the memory devices are mounted, such as single inline memory modules (SIMMs), dual inline memory modules (DIMM5), etc.

Numerous variations and modifications will become apparent to those skilled in the art once the above disclosure is fully appreciated. It is intended that the following claims be interpreted to embrace all such variations and modifications.

What is claimed is:

1. An apparatus comprising:
a first port controller coupled to receive transactions and corresponding quality of service (QoS) parameters on a first port, wherein the first port is configured to detect high priority QoS transactions and to transmit an increment indication to a second clock domain, wherein the first port controller is operable in a first clock domain;
a memory port controller coupled to receive the increment indication from the first port controller, the memory port controller operable in the second clock domain and coupled to a memory port to communicate with a memory controller; and
a cache interface unit coupled to the memory port controller and the first port controller, and wherein the cache interface unit is configured to detect high priority QoS transactions that complete in the cache and configured to transmit a decrement indication to the second clock domain; and wherein the memory port controller is coupled to receive the decrement indication, and wherein the memory port controller is configured to maintain a count of outstanding high priority QoS transactions responsive to the increment indication and the decrement indication, and wherein the memory port controller is configured to push transactions on the memory port at a higher priority responsive to the count being non-zero.

2. The apparatus as recited in claim 1 wherein the first port is a coherency port, and wherein one or more peripheral devices are configured to transmit cache-coherent transactions through the first port to the memory controller port to reach memory.

3. The apparatus as recited in claim 1 wherein the count includes a read count and a write count, wherein the read count corresponds to high priority QoS read transactions and the write count corresponds to high priority QoS write transactions, and wherein the increment indication includes read increment and write increment indications, and wherein the decrement indication includes read decrement and write decrement indications.

4. The apparatus as recited in claim 3 wherein the first port controller is configured to indicate read increment and write increment in response to a high priority QoS read transaction.

5. The apparatus as recited in claim 4 wherein the cache controller is configured to indicate read decrement and write decrement in response to a cache hit by the high priority QoS read transaction.

6. The apparatus as recited in claim 4 wherein the cache controller is configured to indicate write decrement in response to a cache miss by the high priority QoS read transaction that does not cause a victim writeback.

7. The apparatus as recited in claim 4 further comprising a programmed input/output (PIO) port configured to transmit PIO transactions to peripheral devices, and wherein the cache controller is configured to indicate read decrement and write decrement responsive to detecting that the high priority QoS read transaction is a PIO transaction.

8. The apparatus as recited in claim 3 wherein the first port controller is configured to indicate read increment and write increment in response to a high priority QoS write transaction.

9. The apparatus as recited in claim 8 wherein the cache controller is configured to indicate read decrement responsive to a high priority QoS write transaction that writes a complete cache block and for which a writeback operation is generated.

10. The apparatus as recited in claim 1 wherein, in response to a cache hit in the cache for the high priority QoS transaction, the memory port controller is configured to push transactions at the higher priority even in a case that the count is zero, and wherein the cache controller is configured to transmit a token indicating that outstanding transactions in the cache controller at a time that the high priority QoS transaction hits in the cache have been transmitted to the memory port controller, and wherein the memory port controller is configured to terminate pushing transactions responsive to the token.

11. The apparatus as recited in claim 1 wherein the cache interface unit is operable in a third clock domain, and wherein the cache interface unit is configured to transmit the decrement indication from the third clock domain to the second clock domain.

12. An apparatus comprising:
a coherency port controller coupled to receive transactions and corresponding quality of service (QoS) parameters on a coherence port and to transmit the transactions to a cache interface unit;
the cache interface unit coupled to the coherency port controller, wherein the cache interface unit is configured to detect that a high priority QoS transaction hits in the cache and that one or more previous transactions are queued in the cache interface unit to be transmitted to the memory; and
a memory port controller coupled to the coherency port controller and the cache interface unit, wherein the memory port controller is configured to transmit transactions at a higher priority than an initial priority of the transactions to a memory controller on a memory port to which the memory port controller is coupled responsive to the high priority QoS transaction hitting in the cache, wherein the memory port controller is configured to continue transmitting transactions at the higher priority until the previous transactions have been transmitted on the memory port.

13. The apparatus as recited in claim 12 wherein the cache interface unit is configured to transmit a first indication that the previous transactions have been transmitted, and wherein the memory port controller is configured to terminate transmitting at the higher priority responsive to the first indication.

14. The apparatus as recited in claim 13 wherein the cache interface unit comprises a queue of transactions awaiting transmission to the memory port controller, and wherein a content of the queue is the previous transactions, and wherein the queue includes a push indication in each entry, wherein the push indication indicates whether or not a corresponding transaction is one of the previous transactions being pushed, and wherein the cache interface unit is configured to set the push indication for each transaction in the queue to indicate previous transaction being pushed in response to detecting the cache hit for the high priority QoS transaction.

15. The apparatus as recited in claim 14 wherein the cache interface unit is configured to transmit the first indication in response to the queue having no transactions with the push indication indicating previous transaction being pushed.

16. A system comprising:
one or more processors;
a level 2 (L2) cache coupled to the processor;
an interface unit coupled to the L2 cache, wherein the interface unit includes a memory port and a coherency port;
a memory controller coupled to the memory port;
one or more memory devices coupled to the memory controller; and
one or more peripheral devices coupled to the coherency port through a bridge;
wherein at least one of the one or more peripheral devices is configured to issue a first transaction having a high priority level compared to other transactions issued by the one or more peripheral components, and wherein the interface unit is configured to detect the first transaction in a first clock domain corresponding to the coherency port and to transmit an increment event to a second clock domain corresponding to the memory port; and wherein the interface unit is configured to transmit the first transaction to the L2 cache and, in response to a cache hit, is configured to transmit a decrement event to the second clock domain from a third clock domain corresponding to the L2 cache, and wherein the interface unit is configured to maintain a count of outstanding transactions having the high priority level responsive to the increment and decrement events, and wherein the interface unit is configured to issue transactions to the memory controller on the memory port at a higher priority level than an initial priority of the transactions in response to the count indicating one or more outstanding transactions with the high priority level.

17. The system as recited in claim 16 wherein the count indicates one or more outstanding transactions if the count is non-zero.

18. The system as recited in claim 16 wherein the count includes a read count indicating a number of outstanding high priority read transactions and a write count indicating a number of outstanding high priority write operations, wherein increment events comprise independent read increment and write increment events, and wherein decrement events comprise independent read decrement and write decrement events.

19. The system as recited in claim 18 wherein the interface unit, in response to a read transaction having the high priority level on the coherency port, is configured to generate the read increment event for the read and the write increment event for a potential victim writeback.

20. The system as recited in claim 19 wherein the interface unit is configured to generate the write decrement event responsive to a lack of the victim writeback during the L2 cache access for the read transaction.

21. The system as recited in claim 18 wherein the interface unit, in response to a write transaction having the high priority level on the coherency port, is configured to generate the read increment event for a potential read for a cache miss and the write increment event for the write transaction.

22. The system as recited in claim 21 wherein the interface unit is configured to generate the read decrement event responsive to a cache hit during the L2 cache access for the write transaction.

23. A method comprising:
   detecting a first transaction on a coherency port that indicates a first priority level;
   transmitting an increment from a coherency port clock domain corresponding to the coherency port to a memory port clock domain corresponding to a memory port;
   transmitting the first transaction to a cache to detect that the first transaction is a cache hit;
   transmitting a decrement from a cache clock domain corresponding to the cache to the memory port clock domain responsive to detecting the cache hit;
   maintaining a count in the memory port clock domain of transactions having the first priority level responsive to the increment and the decrement.

24. The method as recited in claim 23 further comprising pushing transactions on the memory port at a higher priority level than an initial priority level responsive to the count.

* * * * *